US009458719B2

(12) United States Patent
Liu

(10) Patent No.: US 9,458,719 B2
(45) Date of Patent: Oct. 4, 2016

(54) ROTOR ASSEMBLY FOR ROTARY INTERNAL COMBUSTION ENGINE

(71) Applicant: Nien-Tzu Liu, Taipei (TW)

(72) Inventor: Nien-Tzu Liu, Taipei (TW)

( * ) Notice: Subject to any disclaimer, the term of this patent is extended or adjusted under 35 U.S.C. 154(b) by 172 days.

(21) Appl. No.: 14/473,253

(22) Filed: Aug. 29, 2014

(65) Prior Publication Data

US 2016/0061037 A1 Mar. 3, 2016

(51) Int. Cl.

| F02B 53/00 | (2006.01) |
| F01C 1/00 | (2006.01) |
| F01C 1/44 | (2006.01) |
| F03C 2/00 | (2006.01) |
| F04C 2/00 | (2006.01) |
| F01C 21/08 | (2006.01) |
| F01C 21/04 | (2006.01) |

(52) U.S. Cl.
CPC ............... *F01C 1/44* (2013.01); *F01C 21/08* (2013.01); *F01C 21/0845* (2013.01); *F02B 53/00* (2013.01); *F01C 21/04* (2013.01); *Y02T 10/17* (2013.01)

(58) Field of Classification Search
CPC ........ F01C 1/44; F01C 1/3446; F01C 21/08; F01C 21/0836; F01C 21/0845; F01C 21/0881; F01C 21/04; F04C 2/44; F04C 18/44; F02B 53/00; F02B 53/02; Y02T 10/17
USPC ......... 123/218, 215, 241, 235–236; 418/268, 418/265–266, 261, 145–147, 151, 270, 139, 418/247, 224, 226, 259
See application file for complete search history.

(56) References Cited

U.S. PATENT DOCUMENTS

| 1,550,835 | A | * | 8/1925 | Morgan | F01C 1/44 418/268 |
| 1,592,216 | A | * | 7/1926 | Morgan | F04C 2/44 418/265 |
| 1,715,490 | A | * | 6/1929 | Ballerstedt | F01C 1/44 418/265 |
| 1,935,198 | A | * | 11/1933 | Woo | F04C 2/44 418/258 |
| 3,289,654 | A | * | 12/1966 | Geiger | F01C 1/44 123/241 |
| 3,295,505 | A | * | 1/1967 | Jordan | F01C 1/44 123/241 |
| 3,387,596 | A | * | 6/1968 | Niemand | F01C 1/44 123/241 |
| 3,563,680 | A | * | 2/1971 | Jehle | F01C 1/44 418/265 |

(Continued)

FOREIGN PATENT DOCUMENTS

| DE | 3344181 A1 * | 6/1984 | ............... F04C 2/44 |
| DE | 3401030 A1 * | 7/1985 | ............... F01C 1/44 |

(Continued)

*Primary Examiner* — Thai Ba Trieu
(74) *Attorney, Agent, or Firm* — WPAT, PC; Justin King; Douglas A. Hosack

(57) ABSTRACT

A rotor assembly is mounted in each of an intake-compression chamber and an exhaust-power chamber of a rotary internal combustion engine. The rotor assembly includes a split rotor main body and at least three split blades, which all include a left and a right half. Each blade is turnably assembled to the rotor main body via a pivot shaft. The left and right half bodies are correspondingly provided on their joining faces with at least one recess each, and an elastic element is received in between two facing recesses to normally generate an outward push against the two half bodies while a sufficient looseness is always maintained between the rotor assembly and the cylinder wall to allow smooth rotation of the rotor assembly. Front tips and curved backs of the blades have rollers mounted thereto, so that the blades are in rotary contact with the cylinder wall with reduced friction.

11 Claims, 14 Drawing Sheets

(56) References Cited

U.S. PATENT DOCUMENTS

| | | | | |
|---|---|---|---|---|
| 4,038,948 A * | 8/1977 | Blackwood | ............ | F02B 55/14 123/43 C |
| 4,762,480 A * | 8/1988 | Winkler | ............ | F04C 2/44 418/266 |
| 4,990,074 A * | 2/1991 | Nakagawa | ............ | F04C 2/44 418/268 |
| 5,571,005 A * | 11/1996 | Stoll | ............ | F04C 2/44 418/268 |
| 6,082,324 A * | 7/2000 | Liu | ............ | F01C 1/44 123/235 |
| 6,637,383 B2 * | 10/2003 | Al-Hawaj | ............ | F01C 1/44 123/43 C |
| 7,845,332 B2 * | 12/2010 | Wang | ............ | F01C 1/46 123/241 |
| 7,980,837 B2 * | 7/2011 | Moore | ............ | F01C 1/44 418/268 |
| 8,365,699 B2 * | 2/2013 | Shkolnik | ............ | F02B 55/02 123/222 |
| 2005/0053509 A1 * | 3/2005 | Liposcak | ............ | F04C 2/44 418/268 |
| 2014/0345562 A1 * | 11/2014 | Horstin | ............ | F01C 1/44 123/215 |
| 2014/0352654 A1 * | 12/2014 | Saba | ............ | F01C 1/44 123/200 |

FOREIGN PATENT DOCUMENTS

| | | | | | |
|---|---|---|---|---|---|
| EP | 0181972 A1 | * | 5/1986 | ............ | F01C 1/44 |
| GB | 677674 A | * | 8/1952 | ............ | F01C 1/44 |
| GB | 706292 A | * | 3/1954 | ............ | F04C 2/44 |
| GB | 957593 A | * | 5/1964 | ............ | F04C 2/44 |
| JP | 01100394 A | * | 4/1989 | ............ | F04C 2/44 |
| JP | 02196133 A | * | 8/1990 | | |
| WO | WO 2006120006 A1 | * | 11/2006 | ............ | F01C 21/0881 |
| WO | WO 2014074021 A1 | * | 5/2014 | ............ | F01C 1/40 |

* cited by examiner

-- PRIOR ART --

-- PRIOR ART --

-- PRIOR ART --

ROTOR ASSEMBLY FOR ROTARY INTERNAL COMBUSTION ENGINE

FIELD OF THE INVENTION

The present invention is a reinvention of the rotary internal combustion engine disclosed in U.S. Pat. No. 6,082,324, and is made mainly to enable the rotors of the rotary internal combustion engine to operate more smoothly and to reduce friction between the rotors and the cylinder wall of the rotary internal combustion engine.

BACKGROUND OF THE INVENTION

U.S. Pat. No. 6,082,324 discloses a rotary internal combustion engine, which includes a cylinder internally divided into an intake-compression chamber 10, a combustion chamber 11 and an exhaust-power chamber 12. Please refer to FIGS. 1, 2 and 3. A first eccentric rotor 20 and a second eccentric rotor 30 are provided in the intake-compression chamber 10 and the exhaust-power chamber 12, respectively. When the rotors 20, 30 rotate, blades 21, 31 pivotally mounted thereon are caused to move in a curved motion. Every blade 21, 31 has a front tip and a curved back, which closely bear against the cylinder wall 14 of the cylinder of the rotary internal combustion engine when the rotors 20, 30 rotate, so that closed spaces are formed in the intake-compression chamber 10 and the exhaust-power chamber 12 between the cylinder wall 14 and the rotors 20 and 30, respectively. In the intake-compression chamber 10, the blades 21 push forward to compress intake gas. In the exhaust-power chamber 12, the blades 31 are pushed by high-pressure gas that is produced in the combustion chamber 11 through combustion and explosion and then sent into the exhaust-power chamber 12, so that the rotor 30 is driven to rotate. When the rotor 30 rotates, it brings a power output shaft 13 to rotate at the same time.

The intake-compression chamber 10 is internally provided with a first rotational valve 22 that rotates synchronously with the first rotor 20. The first rotational valve 22 is provided with three valve holes 23. When any of the three valve holes 23 is aligned with an intake port 111 of the combustion chamber 11, the compressed gas in the intake-compression chamber 10 is admitted into the combustion chamber 11. That is, the gas in the intake-compression chamber 10 is compressed by the blades 21 to enter into the combustion chamber 11. When the compressed gas enters into the combustion chamber 11, a fuel is jetted into the combustion chamber 11 to provide a fuel-air mixture, and the fuel-air mixture is ignited to combustion and explodes to produce the high-pressure gas.

The exhaust-power chamber 12 is internally provided with a second rotational valve 32 that rotates synchronously with the second rotor 30. The second rotational value 32 is provided with three valve holes 33. When any of the three valve holes 33 is aligned with an exhaust port 112 of the combustion chamber 11, the high-temperature high-pressure gas produced through the explosion in the combustion chamber 11 is admitted into the exhaust-power chamber 12. When the high-temperature high-pressure gas rushes into the exhaust-power chamber 12, the blades 31 of the second rotor 30 is pushed to move and thereby brings the second rotor 30 and the power output shaft 13 to rotate synchronously. The exhaust-power chamber 12 is provided with an exhaust outlet 121. The exhaust from the engine is guided via the exhaust outlet 121 to an exhaust tube (not shown).

In the course of rotating in the cylinder, the first and second rotors 20, 30 must keep close contact with the cylinder wall 14 to form closed spaces between the cylinder wall 14 and the rotors 20 and 30, so as to compete the stroke of fuel-air mixture compression and the stroke of power output, respectively. However, there must be a predetermined tolerance between the cylinder wall 14 and each of the first and second rotors 20, 30 to allow the rotors 20, 30 to rotate smoothly in the cylinder. Both of the cylinder and the rotors 20, 30 are at an ambient temperature when they are not in operation. When they start operating, the combustion and explosion of the fuel-air mixture produces high temperature. The cylinder will reach a high operating temperature even if there is a cooling fluid circulating outside the cylinder wall 14 for temperature control. When the temperature thereof is raised, the cylinder and the rotors 20, 30 are subjected to thermal expansion to inevitably reduce the space left between the cylinder wall 14 and the first and the second rotor 20, 30. Therefore, it is highly important to work out a way for the rotors 20, 30 to always rotate smoothly in the cylinder at both normal temperature and high temperature.

When the first rotor 20 and the second rotor 30 rotate, the curved backs and the front tips of the blades 21, 31 closely bear against the cylinder 14 in a relative motion in order to form closed spaces in the intake-compression chamber 10 and the exhaust-power chamber 12, respectively. The front tips of the blades 21, 31 are in frictional contact with the cylinder wall 14 to thereby produce high temperature, and one of the cylinder wall 14 and the blades 21, 31 that has a lower hardness will wear gradually. In the case the cylinder wall 14 is the one that wears, the cylinder wall 14 will lose its roundness. Or, in the case the blades 21, 31 are the one that wears, the blades 21, 31 will fail to closely bear against the cylinder wall 14 to achieve the effect of forming closed spaces in the cylinder.

SUMMARY OF THE INVENTION

A primary object of the present invention is to provide a rotor assembly for rotary internal combustion engine, and the rotor assembly includes a split rotor main body and a plurality of split blades that all include a left and a right half, so that the rotor assembly can operate more smoothly.

Another object of the present invention is to provide a rotor assembly for rotary internal combustion engine, and the rotor assembly includes a plurality of blades, each of which has a front tip and a curved back in rotary contact with a cylinder wall of the rotary internal combustion engine to reduce friction between the blades and the cylinder wall and accordingly, extend the service life of the rotary internal combustion engine.

The rotary internal combustion engine using the rotor assembly of the present invention is internally divided into an intake-compression chamber, a combustion chamber and an exhaust-power chamber. The rotor assembly of the present invention is mounted in each of the intake-compression chamber and the exhaust-power chamber, and each of the rotor assemblies of the present invention includes a split rotor main body and at least three split blades. Each of the blades is pivotally connected to the rotor main body via a pivot shaft and is turnable about the pivot shaft. The split rotor main body includes a left half body and a right half body, and has a plurality of dowel pins provided therein to extend into between the left half body and the right half body, so that the left and the right half body are united and move synchronously. Each of the split blades includes a left half blade and a right half blade, and has a dowel pin provided therein to extend into between the left half blade and the right half blade, so that the left and the right half blade are united and move synchronously.

The left and the right half body of the rotor main body are correspondingly provided on their respective joining face with a close annular groove and at least one recess. A leak-proof ring is received in a space defined by between the two facing annular grooves formed on the left and the right half body. An elastic element is received in a space defined by between each pair of two facing recesses formed on the left and the right half body, and the elastic element normally generates an outward push against the left and the right half body. In a preferred embodiment, the elastic element is an undulated sheet metal.

The left and the right half blade of each blade are correspondingly provided on their respective joining face with at least one recess; and a leak-proof strip is received in a space defined by between each pair of two facing recesses formed on the left and the right half blade.

Each of the blades is provided at a front tip with a cylindrical first roller and a first support unit located behind the first roller for bearing a reaction force acted by the cylinder wall to the first roller. The first roller is in rotary contact with the cylinder wall of the rotary internal combustion engine to thereby reduce the friction between the blade and the cylinder wall. The first support unit includes a base and a plurality of needle rollers rotatably fitted between the base and the first roller to reduce the friction between the first roller and the first support unit.

Each of the blades is also provided on a curved back with at least one cylindrical second roller and a second support unit located behind each of the second rollers for bearing a reaction force acted by the cylinder wall to the second rollers. The second rollers on the curved back of the blades are in rotary contact with the cylinder wall to thereby reduce the friction between the blades and the cylinder wall.

With the above arrangements, the rotor assemblies of the present invention can rotate more smoothly with reduced friction in the intake-compression chamber and the exhaust-power chamber of the rotary internal combustion engine, and the rotor main body and the blades can be more easily fabricated, machines and assembled.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 schematically shows the structure of a conventional rotary internal combustion engine.

DETAILED DESCRIPTION OF THE PREFERRED EMBODIMENTS

Figure 1:
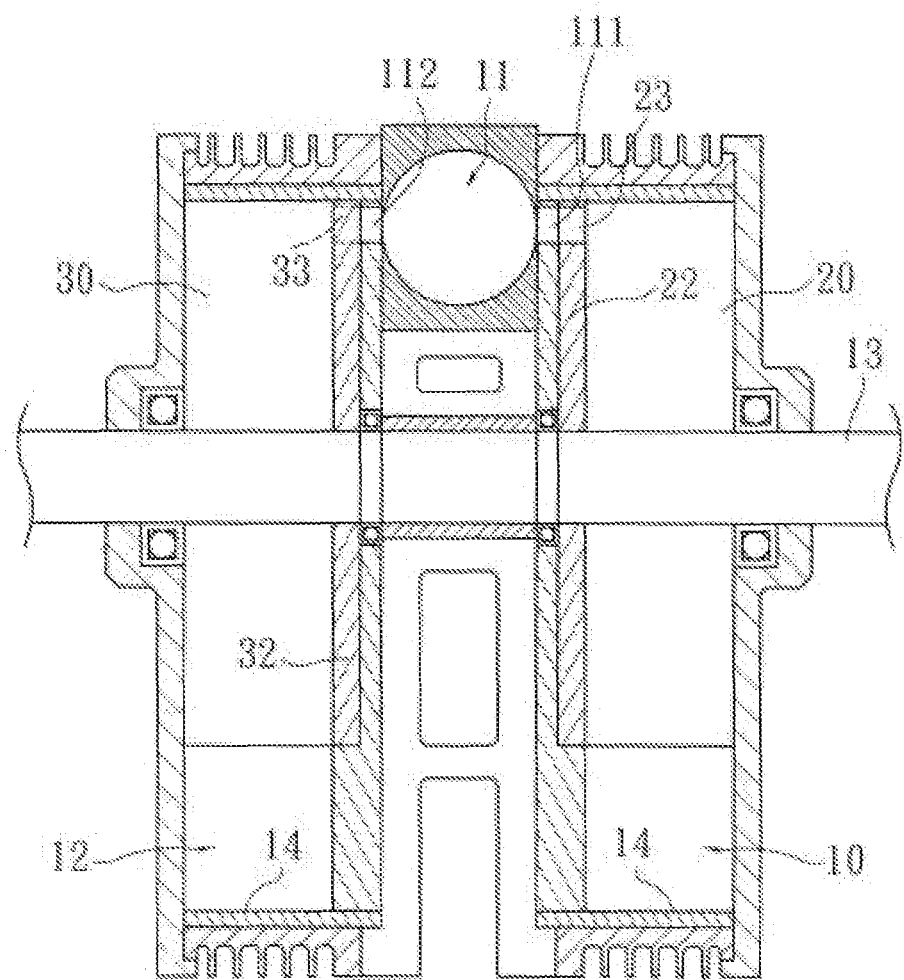
Figure 2:
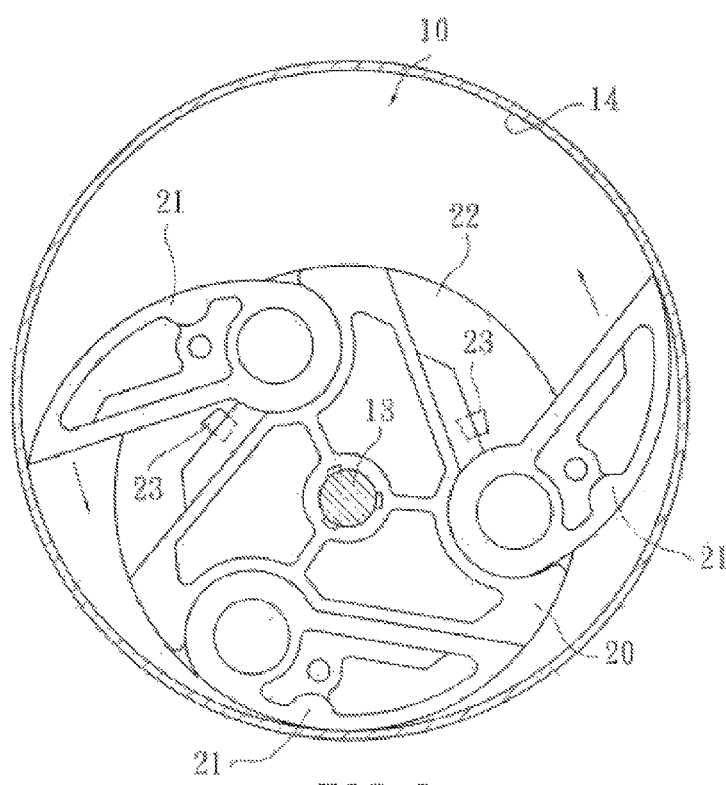
FIG. 2 schematically shows the rotating state of a rotor in an intake-compression chamber of the rotary internal combustion engine of FIG. 1.
Figure 3:
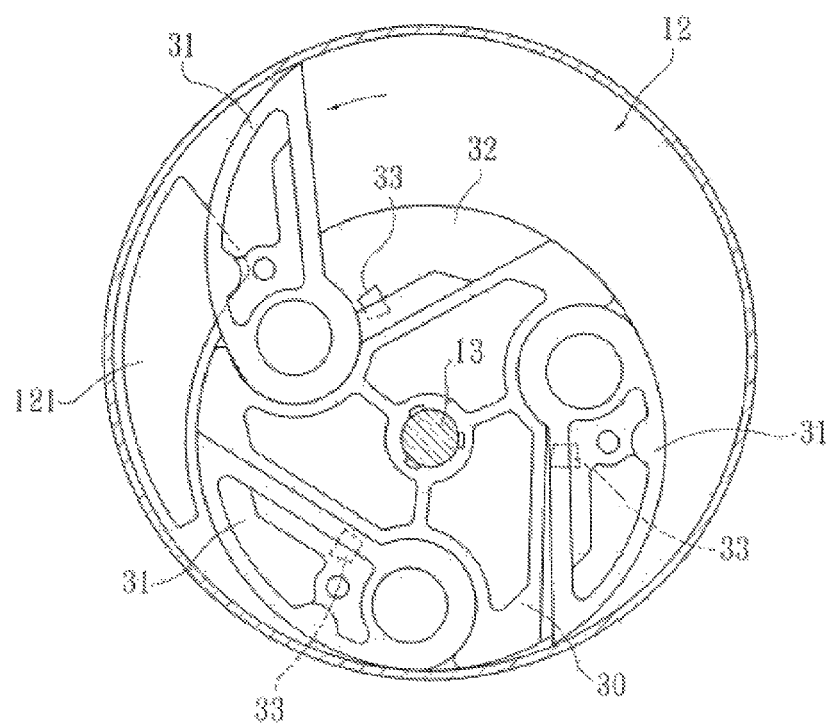
FIG. 3 schematically shows the rotating state of another rotor in an exhaust-power chamber of the rotary internal combustion engine of FIG. 1.
Figure 4:
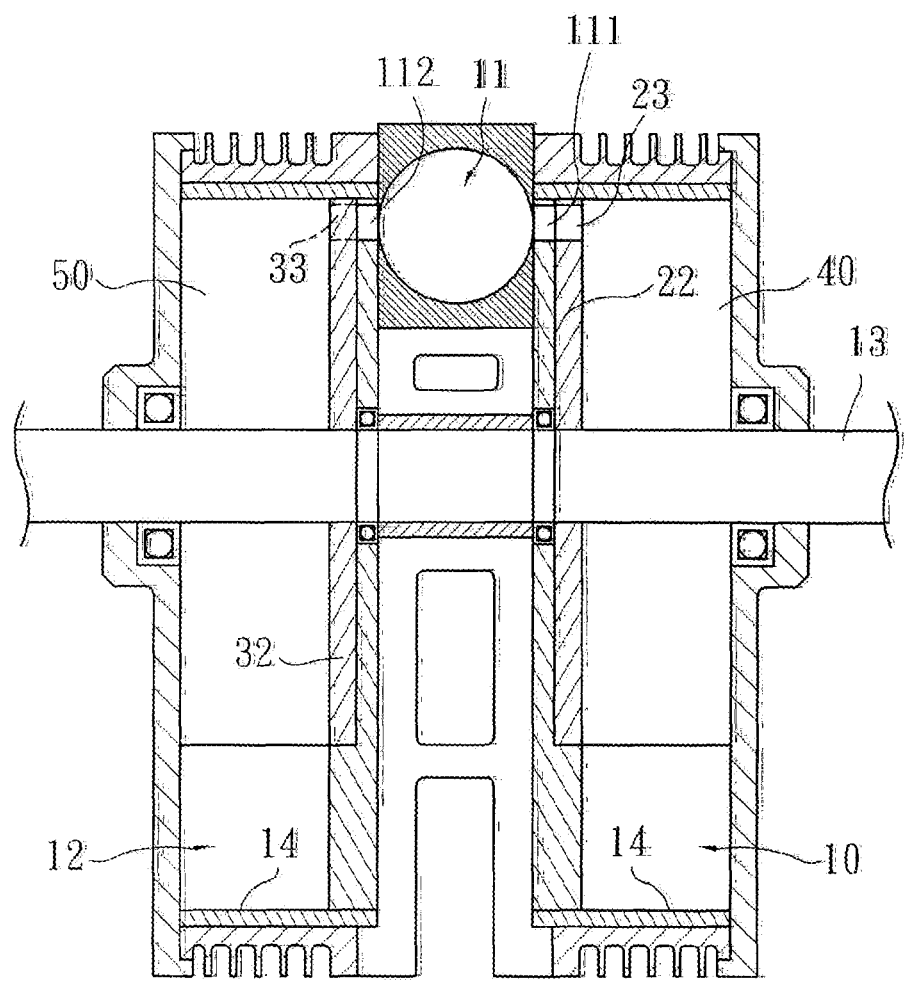
FIG. 4 schematically shows the structure of a rotary internal combustion engine that uses the rotor assembly according to the present invention.

The present invention provides additional designs to the rotary internal combustion engine disclosed in U.S. Pat. No. 6,082,324 mainly to enable smoother operation of the rotary internal combustion engine. As shown in FIG. 4, the rotary internal combustion engine is internally divided into an intake-compression chamber 10, a combustion chamber 11 and an exhaust-power chamber 12. The intake-compression chamber 10 and the exhaust-power chamber 12 are internally provided a rotor assembly 40 and another rotor assembly 50, respectively, of the present invention. Since the rotor assembly 40 in the intake-compression chamber 10 and the rotor assembly 50 in the exhaust-power chamber 12 are identical in structure, the present invention is described based on only the rotor assembly 40 in the intake-compression chamber 10. Please refer to FIGS. 5 and 6. The rotor assembly 40 according to a preferred embodiment thereof includes a split rotor main body 41 and at least three split blades 42. Each of the blades 42 is pivotally connected to the rotor main body 41 via a pivot shaft 43, such that the blade 42 is turnable about the pivot shaft 43 relative to the rotor main body 41. Further, each of the blades 41 has a radially outer surface formed into a smoothly curved back.

Figure 5:
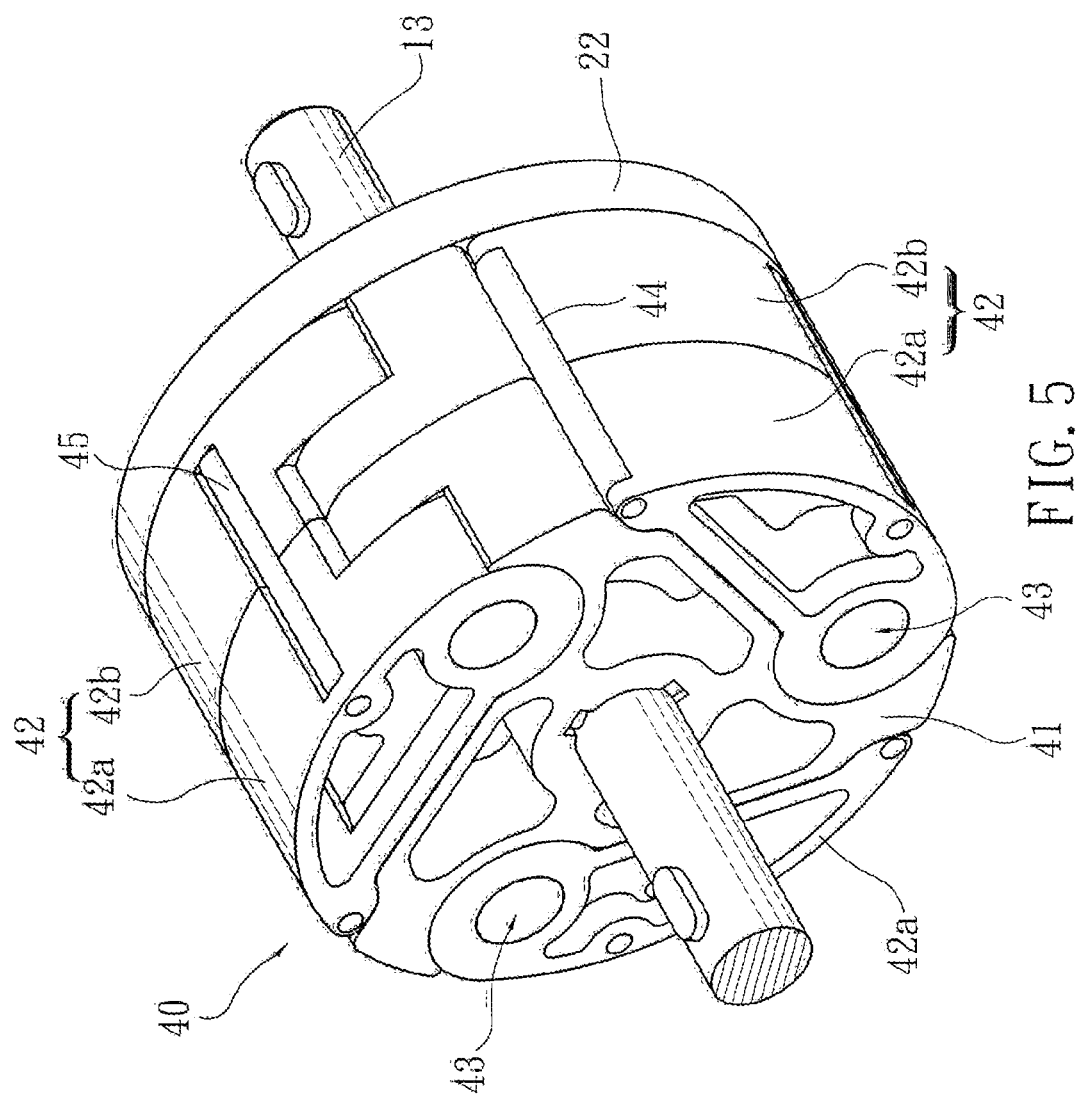
FIG. 5 is a perspective view of a preferred embodiment of the rotor assembly of the present invention for mounting in an intake-compression chamber of the rotary internal combustion engine of FIG. 4.
Figure 6:
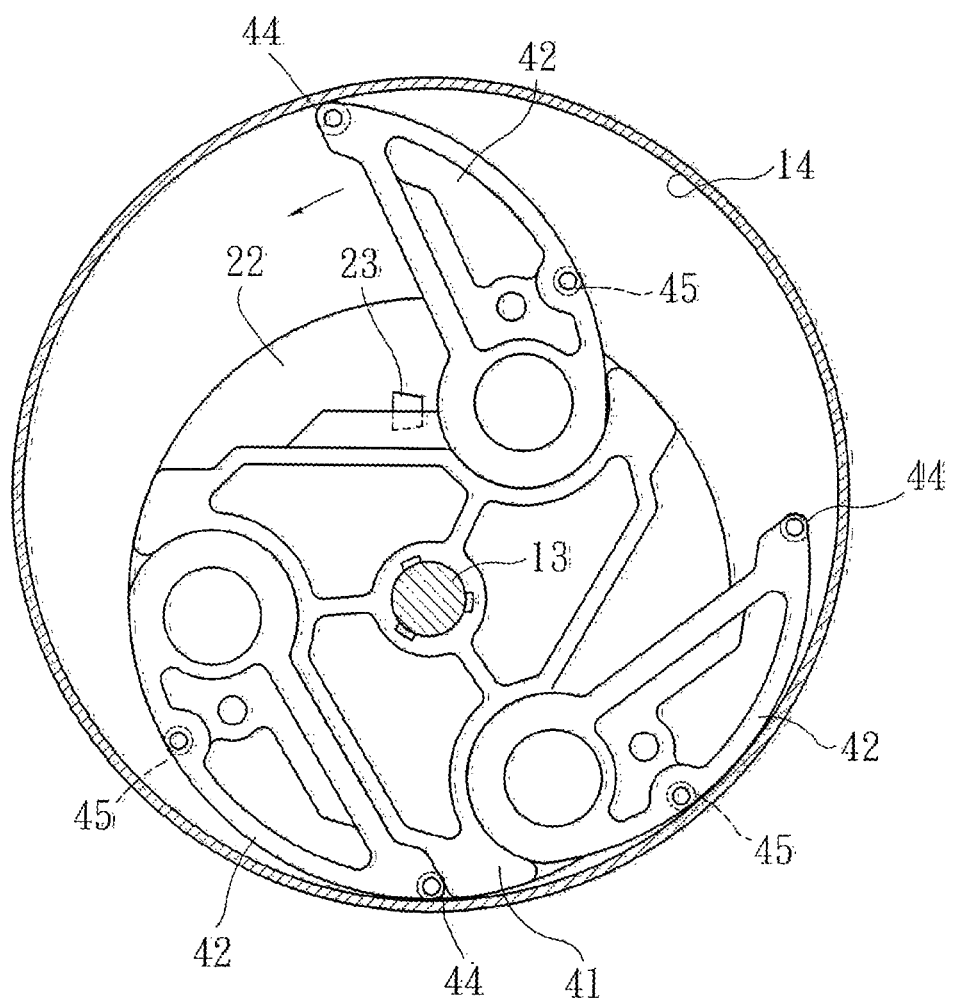
FIG. 6 schematically shows the rotating state of the rotor assembly of FIG. 5.
Figure 7:
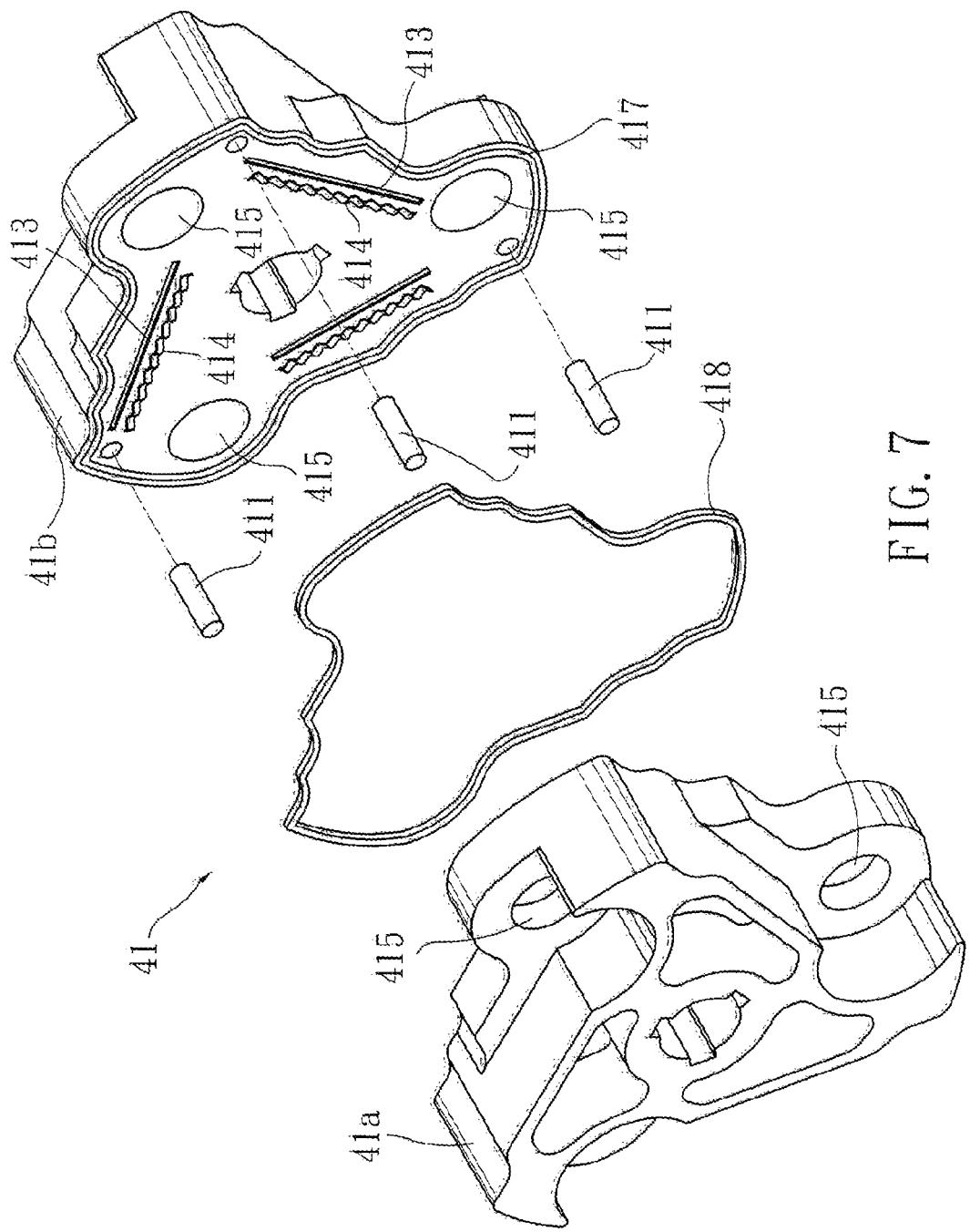
FIG. 7 is an exploded perspective view of a rotor main body of the rotor assembly of FIG. 5.
Figure 8:
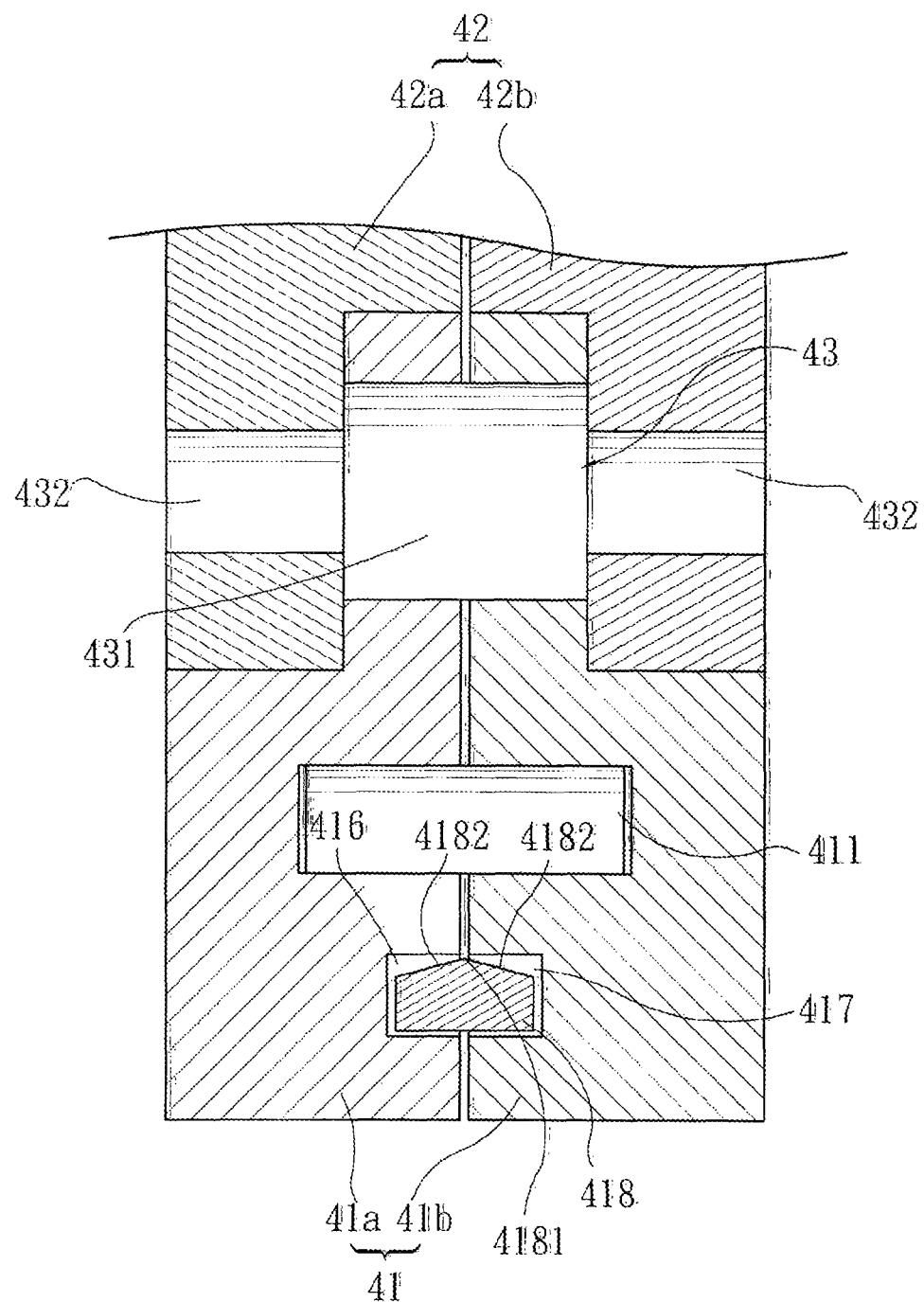
FIG. 8 is a fragmentary, enlarged, assembled sectional view of the rotor assembly of the present invention.
Figure 9:
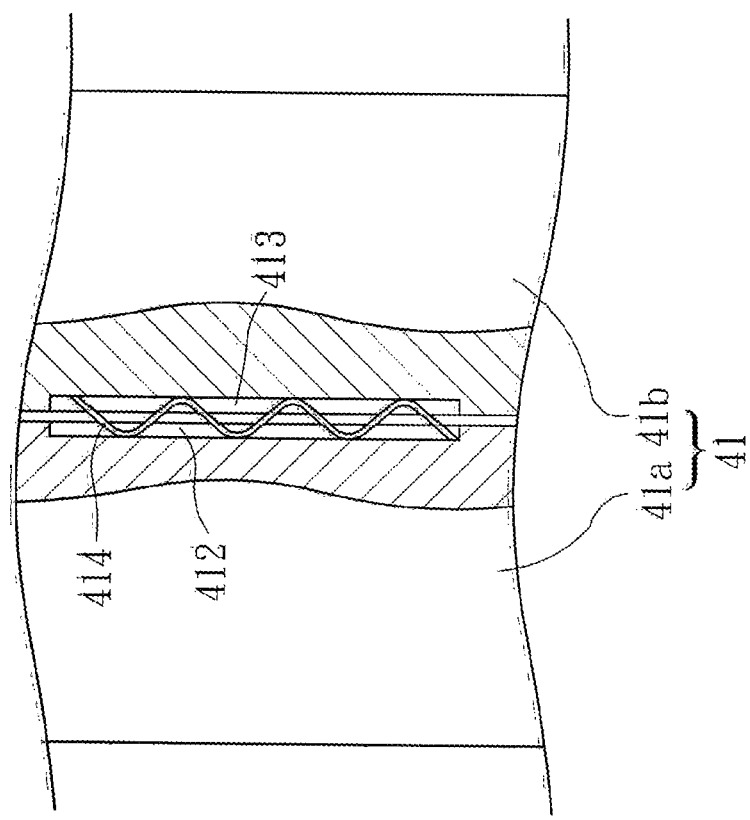
FIG. 9 is a fragmentary, enlarged, assembled sectional view of the rotor main body of FIG. 7.

As can be seen in FIG. 5, the split rotor main body 41 of the rotor assembly 40 includes two halves, namely, a left half body 41a and a right half body 41b. Referring to FIGS. 7 and 8 along with FIGS. 5 and 6, a plurality of dowel pins 411 is provided in the rotor main body 41 to extend into between the left half body 41a and the right half body 41b, so that the left and the right half body 41a, 41b are united and move synchronously. Preferably, at least two dowel pins 411 are provided for the left and the right half body 41a, 41b to correctly aligned and united with each other. Please refer to FIG. 9. The left and the right half body 41a, 41b are correspondingly provided on their joining face with at least one recess 412 and 413, respectively. The recess 412 on the left half body 41a and the recess 413 on the right half body 41b together define a space between them. An elastic element 414 is received in the space defined by the two facing recesses 412, 413 to normally generate an outward push against the left and the right half body 41a, 41b. In the illustrated preferred embodiment of the present invention, the elastic element 414 is in the form of an undulated sheet metal.

As shown in FIGS. 7 and 8, the left and the right half body 41a, 41b of the rotor main body 41 of the rotor assembly 40 are also correspondingly provided on their joining faces with a close annular groove 416 and 417, respectively. The two annular grooves 416, 417 face toward each other to together define a space between them for receiving a metal-made leak-proof ring 418 therein. A part of the leak-proof ring 418 is received in the annular groove 416 on the left half body 41a, and another part of the leak-proof ring 418 is received in the annular groove 417 on the right half body 41b. When the left half body 41a and the right half body 41b shift sidewardly away from each other while the rotor assembly 40 rotates, the leak-proof ring 418 provides a leak prevention effect. The leak-proof ring 418 has a radially outer circumferential surface that includes a central peak portion 4181 and two beveled lateral surfaces 4182. When the beveled lateral surfaces 4182 are subjected to an external force pushing against them, the leak-proof ring 418 is brought to more tightly bear against the wall surfaces of the annular grooves 416, 417 and accordingly, provides an enhanced leak prevention effect.

Figure 10:
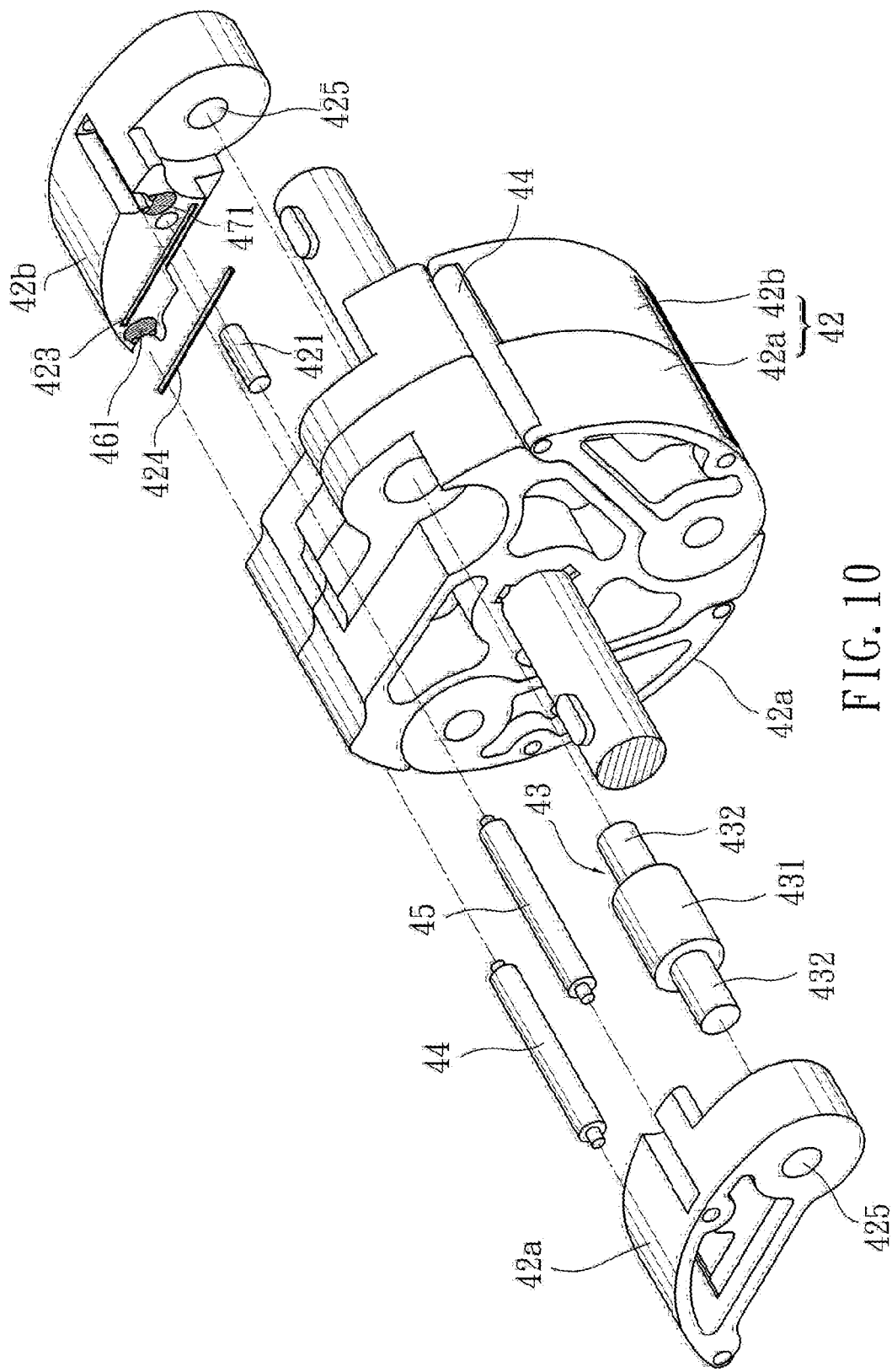
FIG. 10 is an exploded perspective view showing the rotor main body and a blade of the rotor assembly of the present invention.
Figure 11:
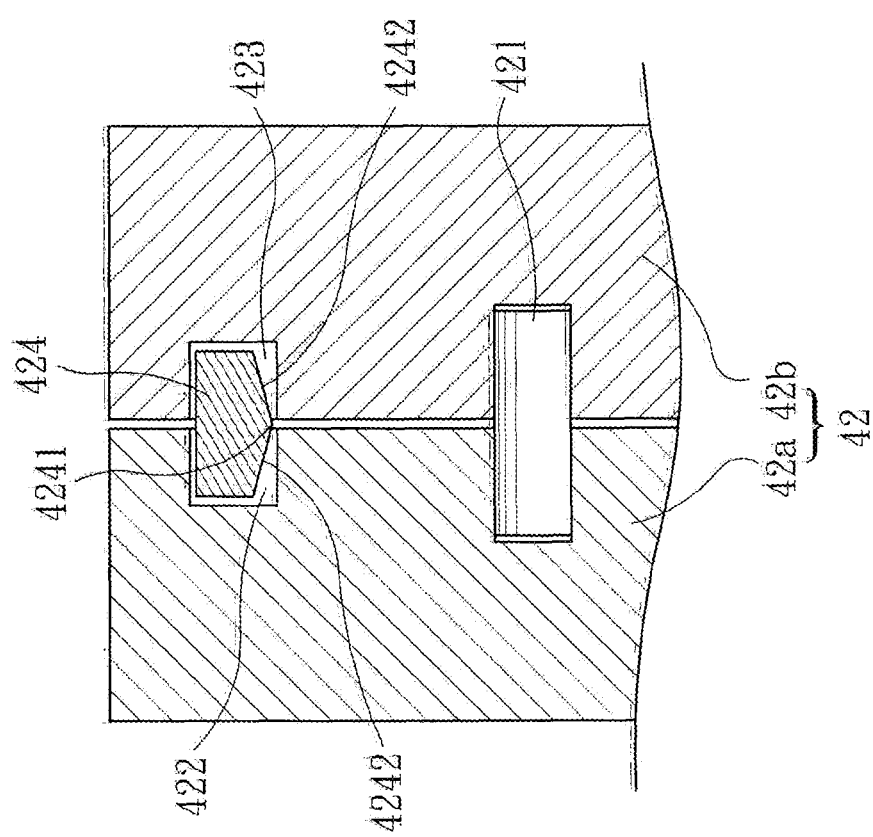
FIG. 11 is a fragmentary, enlarged, assembled sectional view of the blade of FIG. 10.
Figure 12:
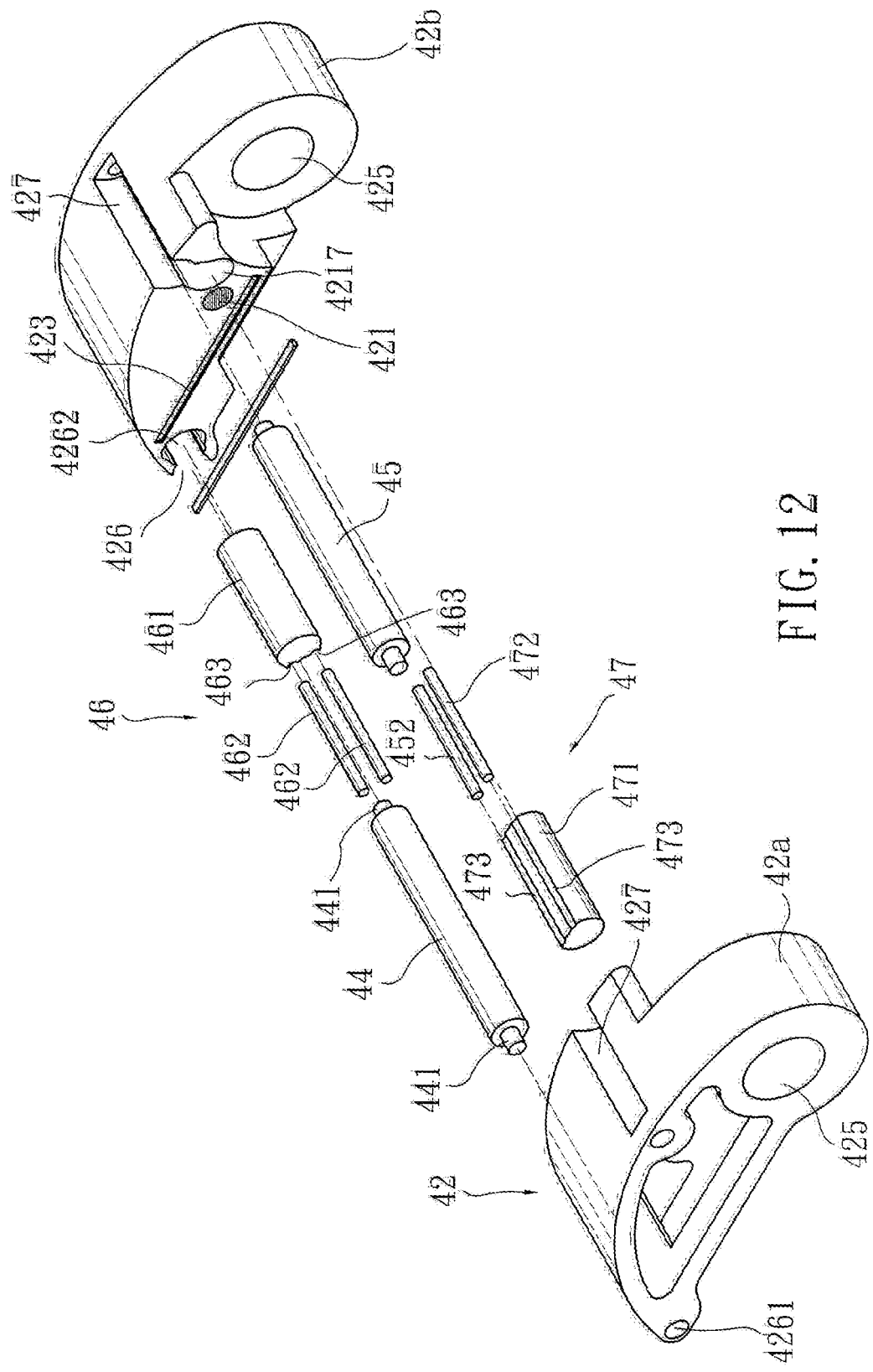
FIG. 12 is an exploded perspective view of the blade of FIG. 10.
Figure 13:
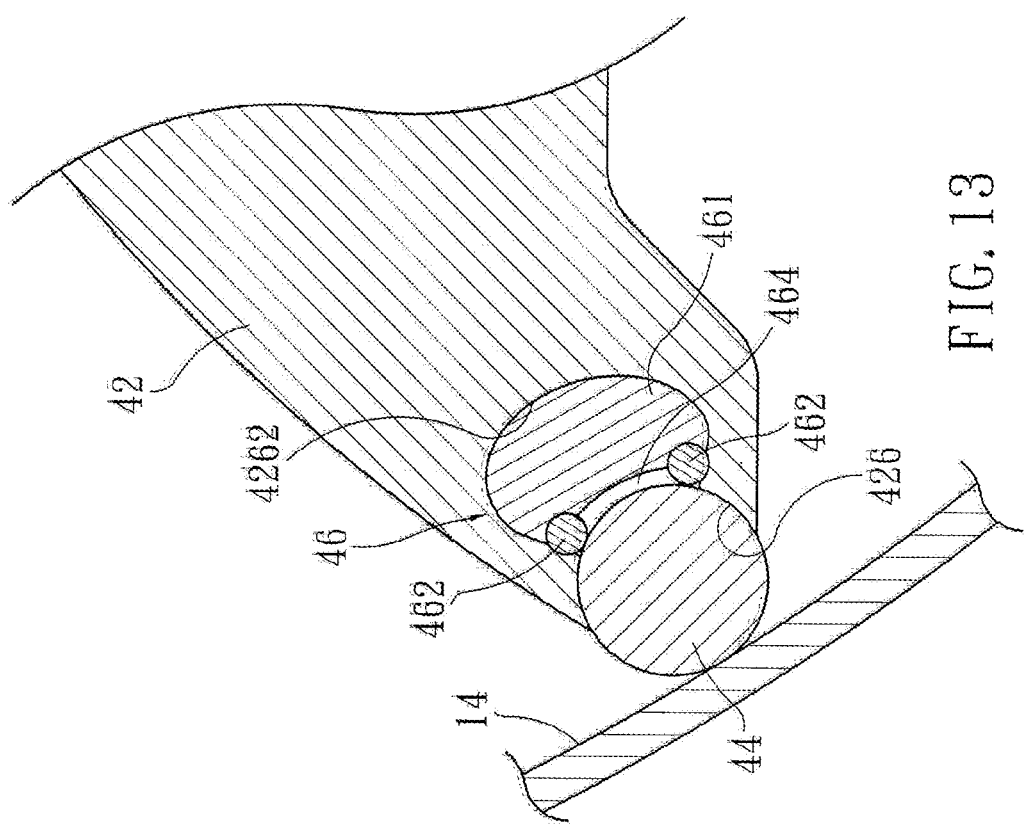
FIG. 13 shows the contact state between a first roller on the blade and a cylinder wall of the rotary internal combustion engine.
Figure 14:
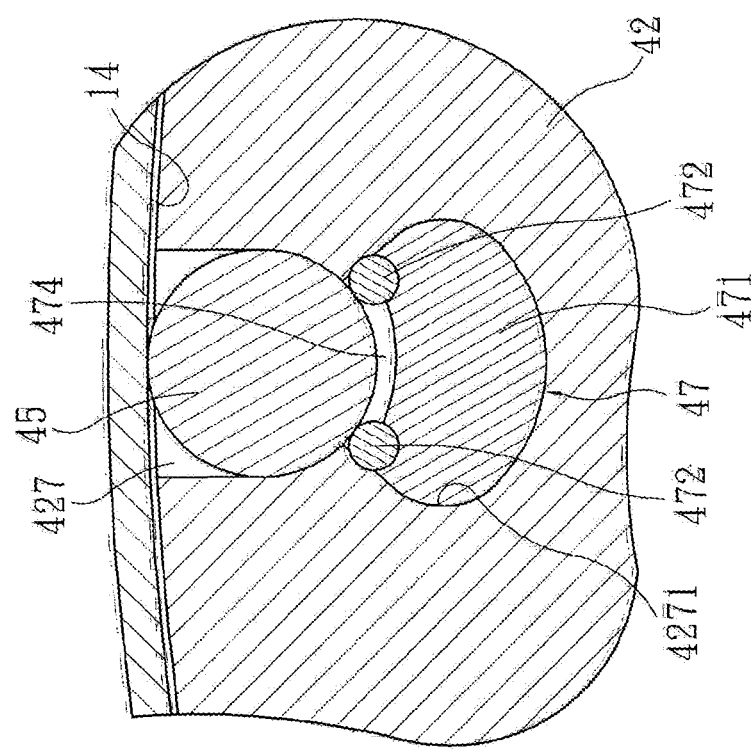
FIG. 14 shows the contact state between a second roller on the blade and the cylinder wall of the rotary internal combustion engine.

Please refer to FIG. 10. Each of the split blades 42 includes two halves, namely, a left half blade 42a and a right half blade 42b. A dowel pin 421 is provided in the blade 42 to extend into between the left half blade 42a and the right half blade 42b, so that the left and the right half blade 42a, 42b are united and move synchronously. Please also refer to FIG. 11. The left and the right half blade 42a, 42b of each blade 42 are correspondingly provided on their joining faces with at least one recess 422 and 423, respectively. Each pair of two recesses 422, 423 facing toward each other together define a space between them for receiving a leak-proof strip 424 therein. When the left half blade 42a and the right half blade 42b shift sidewardly away from each other while the rotor assembly 40 rotates, the leak-proof strip 424 provides a leak prevention effect. The leak-proof strip 424 has one side formed into a central peak portion 4241 and two beveled lateral surfaces 4242. When the beveled lateral surfaces 4242 are subjected to an external force pushing against them, the leak-proof strip 424 is brought to more tightly bear against the wall surfaces of the recesses 422, 423 and accordingly, provides an enhanced leak prevention effect.

The elastic elements 414 in the recesses 412, 413 normally pushes the left and right half bodies 41a, 41b as well as the left and right half blades 42a, 42b laterally outward, so that the rotor assembly 40 and the cylinder wall 14 are able to maintain between them a minimum clearance for the smooth operation of the rotor assembly 40 in the intake-compression chamber 10. The clearance between the left and right half bodies 41a, 41b and between the left and right half blades 42a, 42b is within a tolerance that allows maintenance of an air-tightness between the rotor assembly 40 and the cylinder wall 14. When the rotary internal combustion engine starts rotating, it has a relatively lower temperature while the elastic elements 414 push the left and right half bodies 41a, 41b and the left and right half blades 42a, 42b toward the cylinder wall 14 to maintain the air-tightness between the rotor assembly 40 and the cylinder wall 14. When the rotary internal combustion engine keeps rotating, the temperature thereof rises, bring the rotor main body 41 and the blades 42 to expand due to the high temperature. At this point, the expanded left and right half bodies 41a, 41b as well as the expanded left and right half blades 42a, 42b all compress the clearance between them, making the clearance reduced. However, there is still sufficient looseness between the cylinder wall 14 and the rotor main body 41 and the blades 42 for the rotor assembly 40 to rotate smoothly.

Each of the pivot shafts 43 has a middle section 431 having a diameter larger than that of two end sections 432 of the pivot shaft 43. The middle section 431 of the pivot shaft 43 is extended through a pivot hole 415 (see FIG. 7) formed on the rotor main body 41; and the two end sections 432 of the pivot shaft 43 are extended into two pivot holes 425 formed on the left and the right half blade 42a, 42b of a corresponding one of the blades 42. With the pivot shafts 43 respectively having a diametrically larger middle section 431 and two diametrically smaller end sections 432, the rotor main body 41 and the blades 42 can be held together without the risk of displacing easily.

When assembling the rotary internal combustion engine, the rotor assembly 40 of the present invention can be conveniently and accurately assembled simply by stacking and fitting the left half body 41a, the right half body 41b, the left half blades 42a, the right half blades 42b, the dowel pins 411, 421, the elastic elements 414, the leak-proof ring 418, the leak-proof strips 424 and the pivot shafts 43 layer by layer in a predetermined sequence.

Each of the blades 42 has a first roller 44 and a second roller 45 mounted to a front tip and the curved back of the blade 42, respectively, to reduce friction between the blade 42 and the cylinder wall 14.

Please refer to FIGS. 5, 6, 12 and 13. The first roller 44 is mounted to the front tip of each blade 42 of the rotor assembly 40 for rotatably contacting with the cylinder wall 14. A first support unit 46 is also mounted on the front tip of each blade 42 to support while forward pushes the first roller 44. When the rotary internal combustion engine operates, the high-pressure gas produced in the combustion chamber 11 after ignition and explosion enters into the exhaust-power chamber 12. The high-pressure gas forces the rotor assembly 50 in the exhaust-power chamber 12 to rotate and output power. Meanwhile, the power output shaft 13 of the rotary internal combustion engine is brought by the rotating rotor assembly 50 to rotate, and the rotating power output shaft 13 further brings the rotor assembly 40 in the intake-compression chamber 10 to rotate synchronously. The blades 42 of the rotor assembly 40 closely bear against the cylinder wall 14 when the blades 42 move in a tangential motion. In the course the blades 42 are centrifugally thrown outward relative to the rotor main body 41, the first rollers 44 on the front tips of the blades 42 rotate on the cylinder wall 14 when the front tips of the blades 42 touch the cylinder wall 14. Through the rotary contact between the first rollers 44 and the cylinder wall 14, the friction between the front tips of the blades 42 and the cylinder wall 14 is reduced to avoid wearing of both of the blades 42 and the cylinder wall 14.

The first support unit 46 is adapted to bear a reaction acted to the first roller 44 by the cylinder wall 14, so that the first roller 44 does not retract when it touches the cylinder wall 14. The first support unit 46 includes a base 461 and a plurality of needle rollers 462 fitted between the base 461 and the first roller 44. The base 461 bears the reaction force acted to the first roller 44, and the needle rollers 462 rotate when the first roller 44 rotates relative to the cylinder wall 14 to thereby reduce friction between the first roller 44 and the first support unit 46.

On the base 461 of the first support unit 46, there is provided a plurality of grooves 463 for respectively receiving one needle roller 462 therein. There is a space 464 left between any two adjacent needle rollers 462 of the first support unit 46 for receiving a lubricant therein. The lubricant provides a lubricating effect between the first roller 44 and the needle rollers 462 that rotate relative to one another. With a layer of lubricant attached to the surface of the first roller 44, the friction between the first roller 44 and the cylinder wall 14 can be further reduced.

The left half blade 42a and the right half blade 42b of each blade 42 are correspondingly provided at their front tips with a first recess 426 each, and the first roller 44 is received in these corresponding first recesses 426. The first roller 44 has two opposite ends formed into two diameter-reduced shafts 441 for correspondingly inserting in two lateral holes 4261 (see FIG. 12) provided in the first recesses 426, so that the first roller 44 is assembled to and located between the left and the right half blade 42a, 42b. The first recesses 426 on the left and right half blade 42a, 42b are correspondingly provided at their back portions with a second recess 4262 each, as can be clearly seen in FIG. 13. The second recesses 4262 communicate with the first recesses 426 for receiving the first support unit 46 therein. Therefore, the first roller 44 and the first support unit 46 are clamped in place by between the left half blade 42a and the right half blade 42b.

Please refer to FIGS. 5, 6, 12 and 14. Each of the blades 42 is further provided on the curved back with a cylindrical second roller 45 and a second support unit 470. The second support unit 47 is arranged behind the second roller 45 and is adapted to bear a reaction force acted by the cylinder wall 14 to the second roller 45, so that the second roller 45 does not retract when it touches the cylinder wall 14. In the course the blades 42 are centrifugally thrown outward relative to the rotor main body 41, the second rollers 45 on the curved backs of the blades 42 are in rotary contact with the cylinder wall 14 to reduce friction between the blades 42 and the cylinder wall 14. The second support unit 47 includes a base 471 and a plurality of needle rollers 472 fitted between the base 471 and the second roller 45. The needle rollers 472 rotate when the second roller 45 rotates relative to the cylinder wall 14 to thereby reduce friction between the second roller 45 and the second support unit 47.

On the base 471 of the second support unit 47, there is provided a plurality of grooves 473 for respectively receiving one needle roller 472 therein. There is a space 474 left between any two adjacent needle rollers 472 of the second support unit 47 for receiving a lubricant therein. The lubricant provides a lubricating effect between the second roller 45 and the needle rollers 472 that rotate relative to one another. With a layer of lubricant attached to the surface of the second roller 45, the friction between the second roller 45 and the cylinder wall 14 can be further reduced.

The left half blade 42a and the right half blade 42b of each blade 42 are correspondingly provided on their curved backs with a third recess 427 each, and the second roller 45 can be assembled to and located in place on each blade 42 by inserting it into the third recesses 427. The third recesses 427 on the left and right half blade 42a, 42b are correspondingly provided at their back portions with a fourth recess 4271 each, as can be clearly seen in FIG. 14. The fourth recesses 4271 are provided for receiving the second support unit 47 therein. Therefore, the second roller 45 and the second support unit 47 are clamped in place by between the left half blade 42a and the right half blade 42b.

With the above arrangements, the front tips and the curved backs of all the blades 42 of the rotor assembly 40 are in rotary contact with the cylinder wall 14, which not only reduces the friction between the blades 42 and the cylinder wall 14, but also allows the rotary internal combustion engine to have extended service life.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A rotor assembly, for a rotary internal combustion engine, comprising a cylinder wall enclosing at least one of an intake-compression chamber and an exhaust-power chamber, the rotor assembly comprising:
   a rotor main body comprising:
      a left half body;
      a right half body; and
      a plurality of dowel pins, extending between the left half body and the right half body, connecting the left half body and the right half body to rotate synchronously;
   at least three blades, each of the at least three blades comprising:
      a left half blade;
      a right half blade;
      a first cylindrical first roller, disposed on a front tip of the blade; and
      a second cylindrical roller, disposed on a curved back of the blade; and
   a pivot shaft, pivotally connecting said each of the at least three blades to the rotor main body,
      wherein the rotor assembly is mounted in said at least one of the intake-compression chamber and the exhaust-power chamber, whereby the first cylindrical roller and the second cylindrical roller roll along the cylinder wall when the at least three blades centrifugally pivot outward relative to the rotor main body due to rotor assembly rotation.

2. The rotor assembly of claim 1, further comprising:
   a left recess, within the left half body;
   a right recess, within the right half body aligned with the left recess; and
   an elastic element disposed in the left recess and the right recess and generating a push between the left half body and the right half body.

3. The rotor assembly of claim 2, wherein the elastic element is in the form of an undulated sheet metal.

4. The rotor assembly of claim 1 further comprising a leak-proof ring disposed within a left close annular groove in the left half body and a right close annular groove in the right half body.

5. The rotor assembly of claim 1 further comprises a leak-proof strip disposed within a left recess in the left half blade and a right recess in the right half blade.

6. The rotor assembly of claim 1, wherein the pivot shaft includes a middle section having a diameter larger than that of two end sections of the pivot shaft; the middle section of the pivot shaft being extended through a pivot hole formed on the rotor main body, and the two end sections of the pivot shaft being extended into two pivot holes formed on the left and the right half blade of one corresponding blade.

7. The rotor assembly of claim 1, wherein said each of the at least three blades further includes a first support unit mounted on the front tip of the blade behind the first roller for bearing a force from the cylinder wall to the first roller; the first support unit including a base and needle rollers fitted between the base and the first roller, and the base of the first support unit being provided with a plurality of grooves for respectively receiving one of the needle rollers therein.

8. The rotor assembly of claim 7, wherein the first support unit further comprises a lubricant space between two of the needle rollers being adjacent.

9. The rotor assembly of claim 7, wherein said each of the at least three blades further includes a second support unit mounted on the curved back of the blade behind the second roller for bearing a force from the cylinder wall to the second roller; the second support unit including a base and needle rollers fitted between the base and the second roller, and the base of the second support unit being provided with a plurality of grooves for respectively receiving one of the needle rollers therein.

10. The rotor assembly of claim 9, wherein the second support unit further comprises a lubricant space between two of the needle rollers being adjacent.

11. The rotor assembly of claim 1, wherein said each of the at least three blades further comprises at least one additional dowel pin, extending between the left half blade and the right half blade to connect the left half blade and the right half blade to rotate synchronously.

* * * * *